United States Patent
Baker et al.

[11] Patent Number: 5,970,185
[45] Date of Patent: Oct. 19, 1999

[54] OPTICAL SWITCHES, MODULATORS AND TRANSMITTERS

[75] Inventors: Nigel Baker, Harlow; Ross Alexander Saunders, Fife, both of United Kingdom

[73] Assignee: Northern Telecom Limited, Montreal, Canada

[21] Appl. No.: 08/961,970

[22] Filed: Oct. 31, 1997

[51] Int. Cl.[6] .......................... G02F 1/035; H04B 10/04
[52] U.S. Cl. .................. 385/3; 385/6; 385/8; 385/16; 359/183; 359/187; 359/188
[58] Field of Search .................. 385/1–3, 6–8, 385/16, 22, 23, 42, 129, 10, 37; 359/180, 183, 187, 188, 161; 250/227.19

[56] References Cited

U.S. PATENT DOCUMENTS

| | | | |
|---|---|---|---|
| 5,056,885 | 10/1991 | Chinn | 385/16 |
| 5,247,594 | 9/1993 | Okuno et al. | 385/16 |
| 5,278,923 | 1/1994 | Nazarathy et al. | 385/3 |
| 5,377,284 | 12/1994 | Bülow | 385/11 |
| 5,703,975 | 12/1997 | Miller et al. | 385/16 |
| 5,710,653 | 1/1998 | Nemecek et al. | 359/187 |

FOREIGN PATENT DOCUMENTS

| | | |
|---|---|---|
| 0813097A1 | 12/1997 | European Pat. Off. . |
| WO 96/42027 | 12/1996 | WIPO . |

*Primary Examiner*—Hemang Sanghavi
*Attorney, Agent, or Firm*—Lee, Mann, Smith, McWilliams, Sweeney & Ohlson

[57] ABSTRACT

An optical interferometer incorporating a signal strength modulated optical phase delay, such as a Kerr effect element in one of its arms is employed to improve the cross-talk isolation/extinction ratio of an optical switch, amplitude modulator, or amplitude modulated optical transmitter. The Kerr element is constructed so that its intensity dependent optical path length is such as to provide destructive interference at the interferometer output when the light input to the interferometer is low, and constructive interference when the input is high. The place of the Kerr effect element can alternatively be taken by an electro-optic modulator driven with an electrical version of the data modulation appearing on the optical signal.

22 Claims, 5 Drawing Sheets

OPTICAL SWITCHES, MODULATORS AND TRANSMITTERS

BACKGROUND OF THE INVENTION

This invention relates to optical switches, digital amplitude modulators and digitally modulated transmitters, and is particularly concerned with improvement of the extinction ratio of such devices.

A primary function of a switch, or digital amplitude modulator, is that in its ON state it should exhibit relatively low attenuation and that in its OFF state it should exhibit relatively high attenuation. The ratio of the ON attenuation to the OFF attenuation is known as the extinction ratio, or the cross-talk isolation, of the switch. This should be as large as possible, and for some types of switch, in some applications, is found to be inconveniently low.

A similar situation exists in respect of digitally modulated optical transmitters. The bit error rate performance of such optical transmitters is degraded by a poor extinction ratio and in an optically amplified system the problem of poor extinction ratio is exacerbated by increased signal-spontaneous beat noise on the data zeros. Optical Time Domain Multiplexed (OTDM) systems, in particular, require a high transmitter extinction ratio in order to minimise coherent mixing effects in the multiplexed signal.

SUMMARY OF THE INVENTION

It is an object of the present invention to provide a transmission system in which compensation is provided to cancel out at least a part of the deleterious effects of poor cross-talk isolation/extinction ratio.

This improvement is effected according to the teachings of the present invention by the use of an interferometer configuration incorporating a signal strength modulated optical phase delay effect element in an interference arm thereof. The phase delay provided by this element is modulated by π between the condition in which the delay that it provides is of a value providing substantially fully constructive interference at the output of the interferometer and that in which it provides substantially fully destructive interference.

The signal strength modulated optical phase delay element may take the form of a Kerr effect element, in which case the modulation is effected by the optical signal itself; or it may take the form of an electro-optic phase modulator, in which case the modulation is provided by an electrical modulation signal. In many instances the data modulation will itself involve the provision of an electrical format of data signal, in which case such a signal can, after making any necessary amplitude and phase adjustments, be directly used for modulating the electro-optic phase modulator. If, however such a format is not already available, it can be provided by detecting a tapped-off portion of the data-modulated optical signal.

When using a Kerr effect element as the signal strength modulated optical phase delay element, it is preferred to employ a Kerr element in the form of a semiconductor optical amplifier located in a magnetic field.

When using an electro-optic phase modulator as the signal strength modulated optical phase delay element, the preferred form of modulator is a lithium niobate modulator.

Other advantages and features of the invention will be readily apparent from the following description of the preferred embodiments, the drawings and the claims.

DESCRIPTION OF THE PREFERRED EMBODIMENTS

Figure 1:
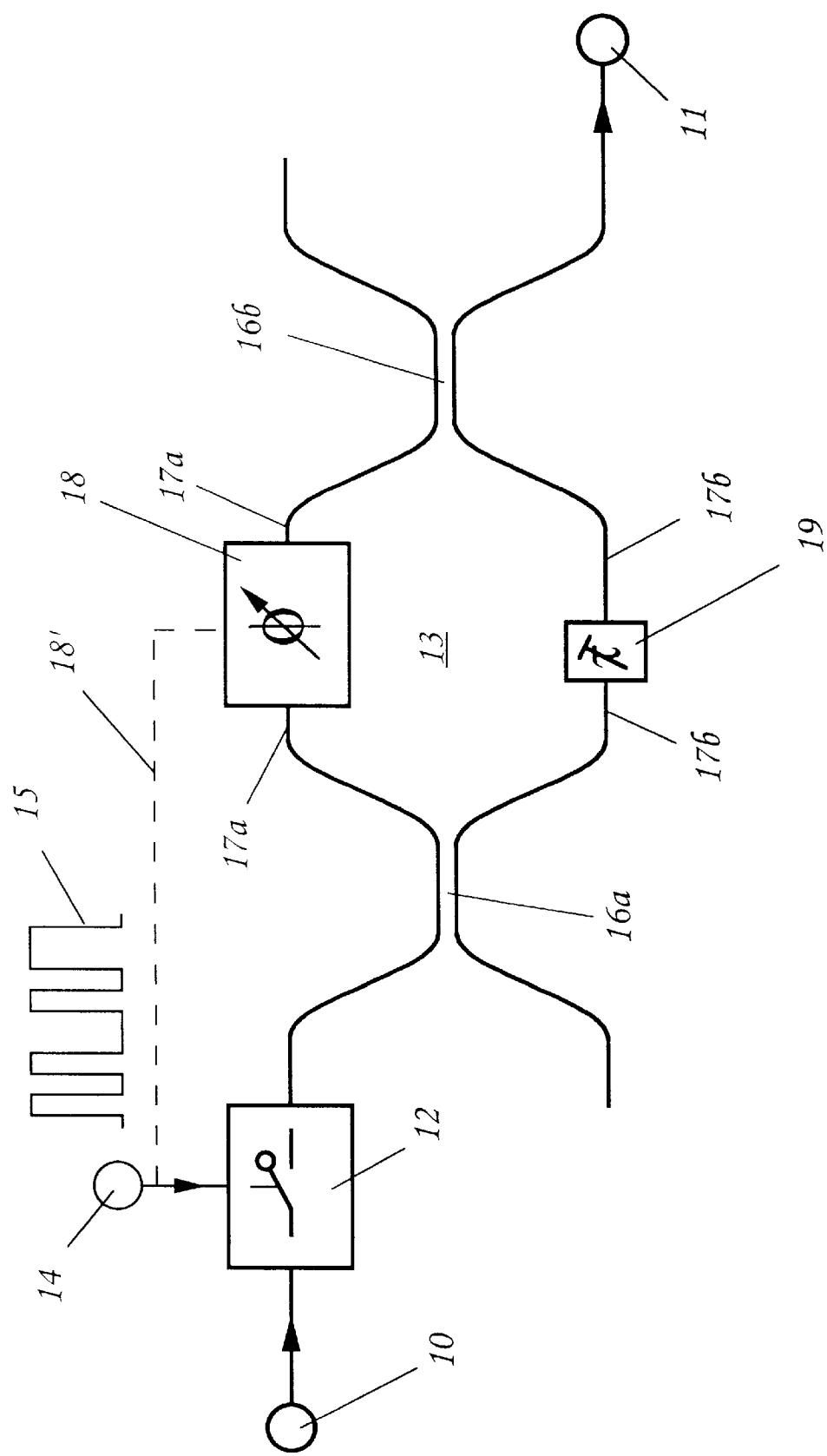
FIG. 1 is a schematic diagram of an optical switch, embodying the invention in a preferred form.

Referring to FIG. 1, an optical switch, or amplitude modulator, has an optical input 10 optically coupled with an optical output 11 via a tandem arrangement of an actively switchable element 12 and an optical interferometer configuration indicated generally at 13. The actively switchable element 12 is represented as having an electrical input terminal 14 to which a digital data stream 15 is applied. The interferometer configuration is a Mach Zehnder configuration comprising a pair of 3 dB optical waveguide couplers 16a and 16b defining between them a pair of optical waveguide interference arms 17a and 17b. Though the couplers 16a and 16b are depicted as being of the 4-port type, they may alternatively be of the 3-port type. In interference arm 17a is located a signal strength modulated optical phase delay element 18, and in one of the interference arms there is also located an optical path length adjustment element 19.

The switchable element 12 may for instance be constituted by a Stark effect modulator. The signal strength modulated optical phase delay element 18 may be a Kerr effect element, which may similarly be constituted by semiconductive material, for instance in the form of a semiconductive optical amplifier element placed in a magnetic field and biased for near transparency. Alternative forms of switchable element include polymer thermo-optic switching elements and elements utilising the electro-optic effect, such as in lithium niobate, in a Mach Zehnder interferometer configuration.

Figure 2:
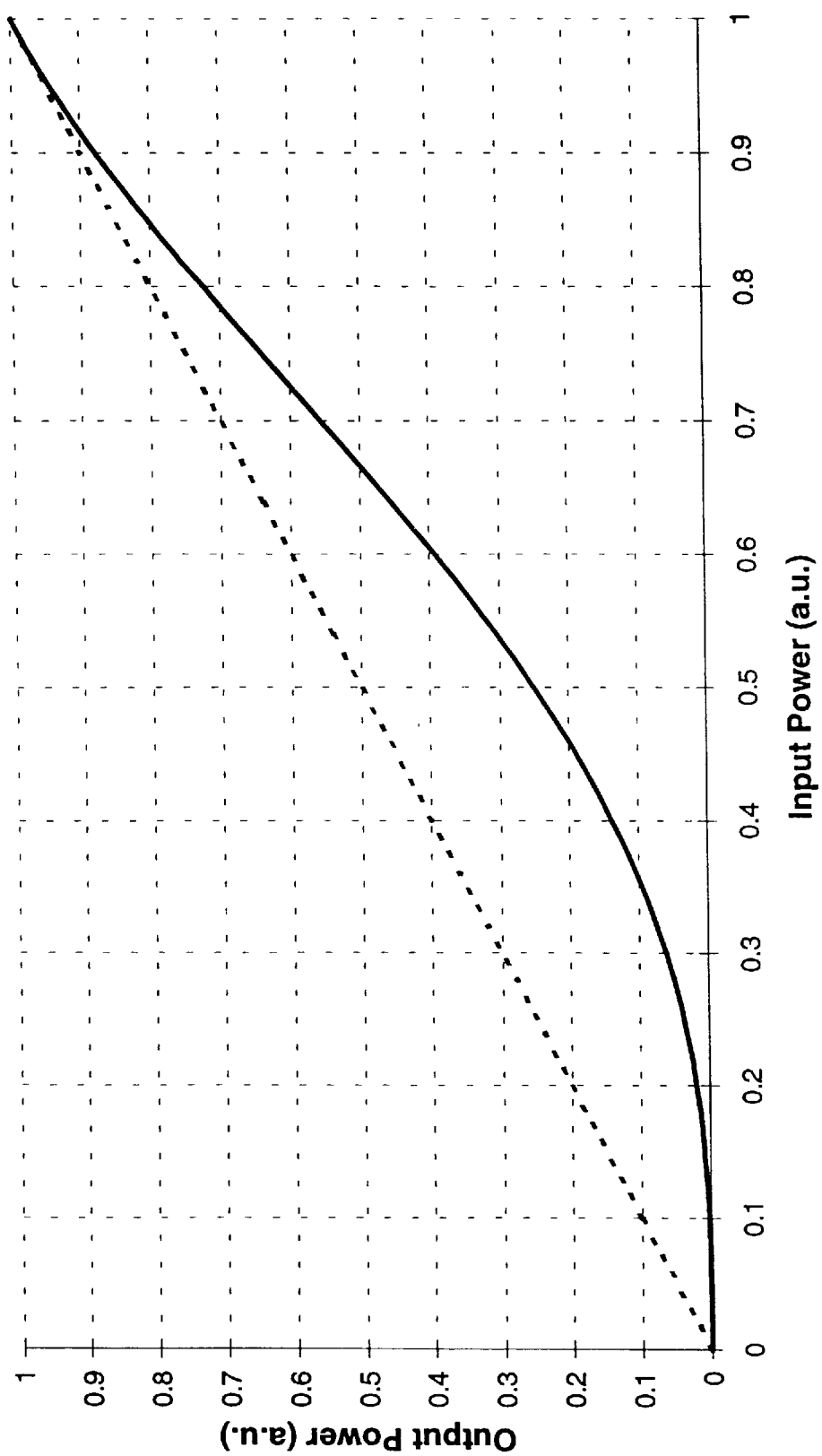
FIG. 2 is a graphical representation depicting the transfer function of the Mach Zehnder interferometer component of the switch of FIG. 1.
Figure 3:
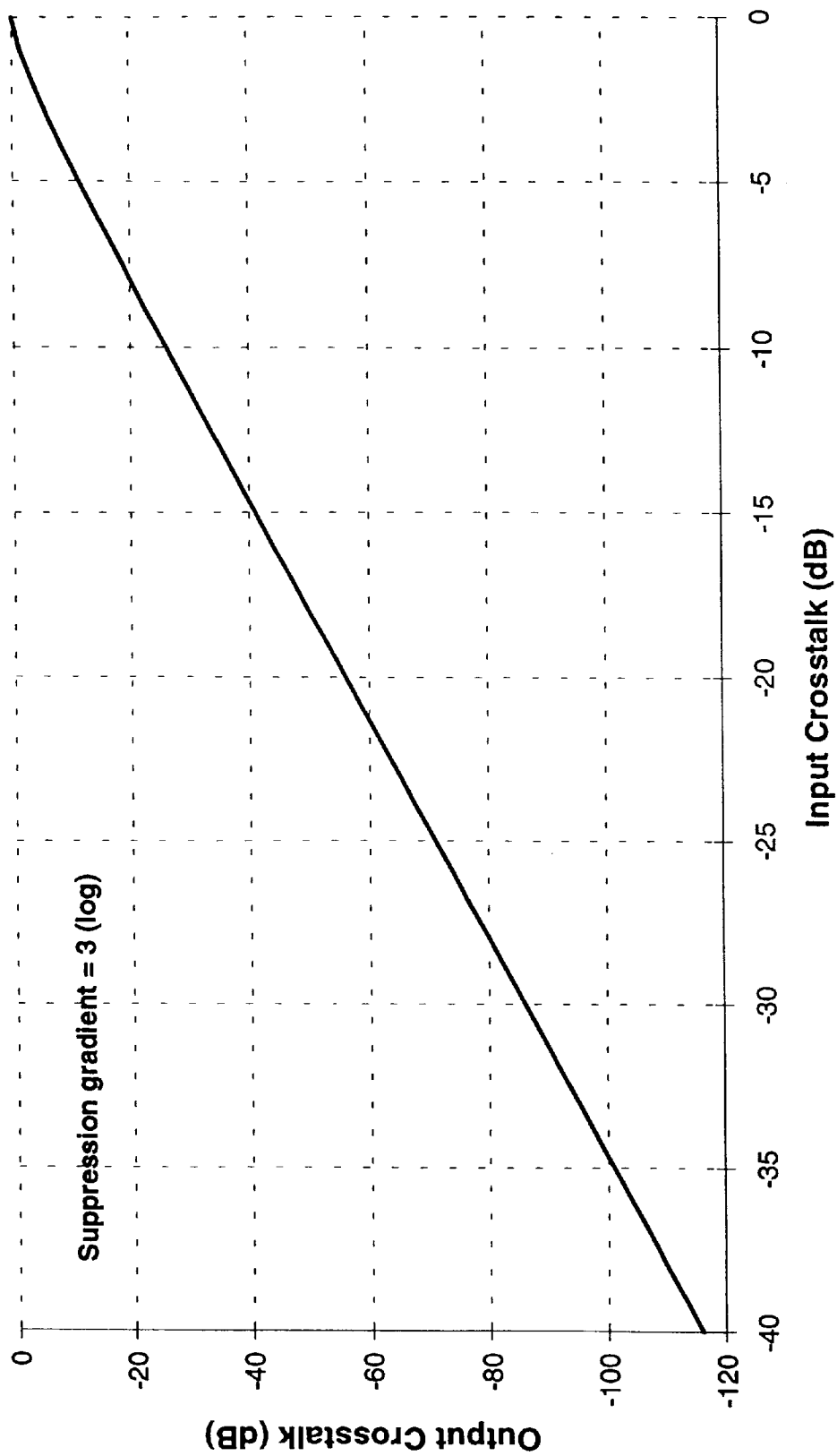
FIG. 3 is a graphical representation depicting the improvement in the cross-talk isolation of the switch of FIG. 1 that results from its use of its Mach Zehnder interferometer component.

The two interferometer arms 17a and 17b are constructed to be of exactly or nearly equal optical path length. The optical path length adjustment element 19 is provided to enable the difference in optical path length of the two interferometer arms to be brought to provide, under zero light conditions through the element 18, a phase difference of 0 or π, according to from which output arm of the 3 dB coupler 16b the output 11 is taken. In the case of a signal strength modulated optical phase delay element 18 constituted by a Kerr effect element, the output 11 is taken from the output arm for which the phase difference under zero light conditions through the element 18 provides the minimum amplitude output. By making the optical path length difference either zero or a small value, the free spectral range of the interferometer is made large so that its operation is made not unduly wavelength sensitive. The Kerr effect element 18 exhibits an intensity dependent change in its refractive index ($n=n_0+n_2.I$), where $n_2$ is the Kerr coefficient of the Kerr element, $I$ is the optical intensity, and $n_0$ is the linear refractive index of the Kerr element. The length of the Kerr element, in relation to its Kerr coefficient and the intensity of the light that the switch is intended to switch, is chosen such that the element produces a phase change of approximately π when the light intensity through it changes consequent upon a transition of the switchable element 12 from a data '1' to a data '0' (ON state to OFF state transition), or vice versa. (The light intensity through the Kerr element 18 in the data ON state is half that applied to the interferometer as a whole, the other half being transmitted through the optical path length adjustment element 19 located in the other interference arm.) The transfer function for the Mach Zehnder interferometer 13 under these conditions is depicted by the solid line in FIG. 2. The degree of improvement in cross-talk isolation/extinction ratio is shown in FIG. 3. If the input cross-talk provided by the switchable element 12 is known and stable, then the output isolation provided by the Mach Zehnder can be further increased by adjustment of the optical path length adjuster 19 so that the phase difference resulting from the difference in optical path length between the two interference arms 17a and 17b is π (or 0, as appropriate), not for the zero level of light propagating through the Kerrr element 18, but for the residual light level through it provided by the cross-talk of the switchable element 13 in its OFF state.

Figure 4:
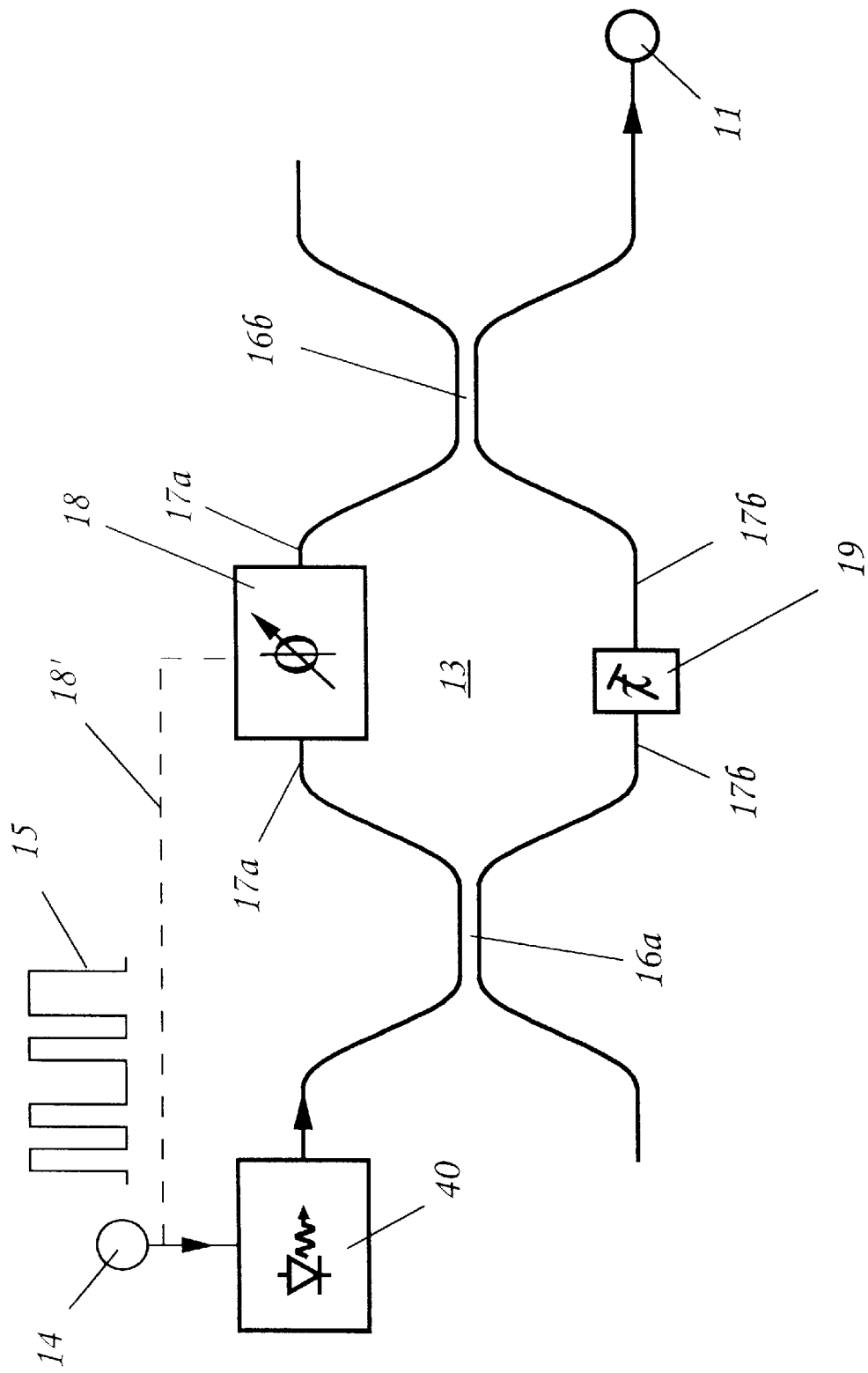
FIG. 4 is a schematic diagram of an optical transmitter embodying the invention in a preferred form.

FIG. 4 depicts an optical transmitter embodiment of the present invention. It differs from the switch embodiment of FIG. 1 by the replacement of the switchable element 12 of FIG. 1 with a digitally amplitude modulated optical source 40. Typically the optical power for this source is provided by the emission of a semiconductor laser diode. The optical emission of such a laser diode may be directly modulated by modulation of the drive current applied to the diode. Alternatively, the diode may be driven c.w. to provide an emission which is subsequently optically modulated using a switchable element such as the switchable element 12 of FIG. 1.

Figure 5:
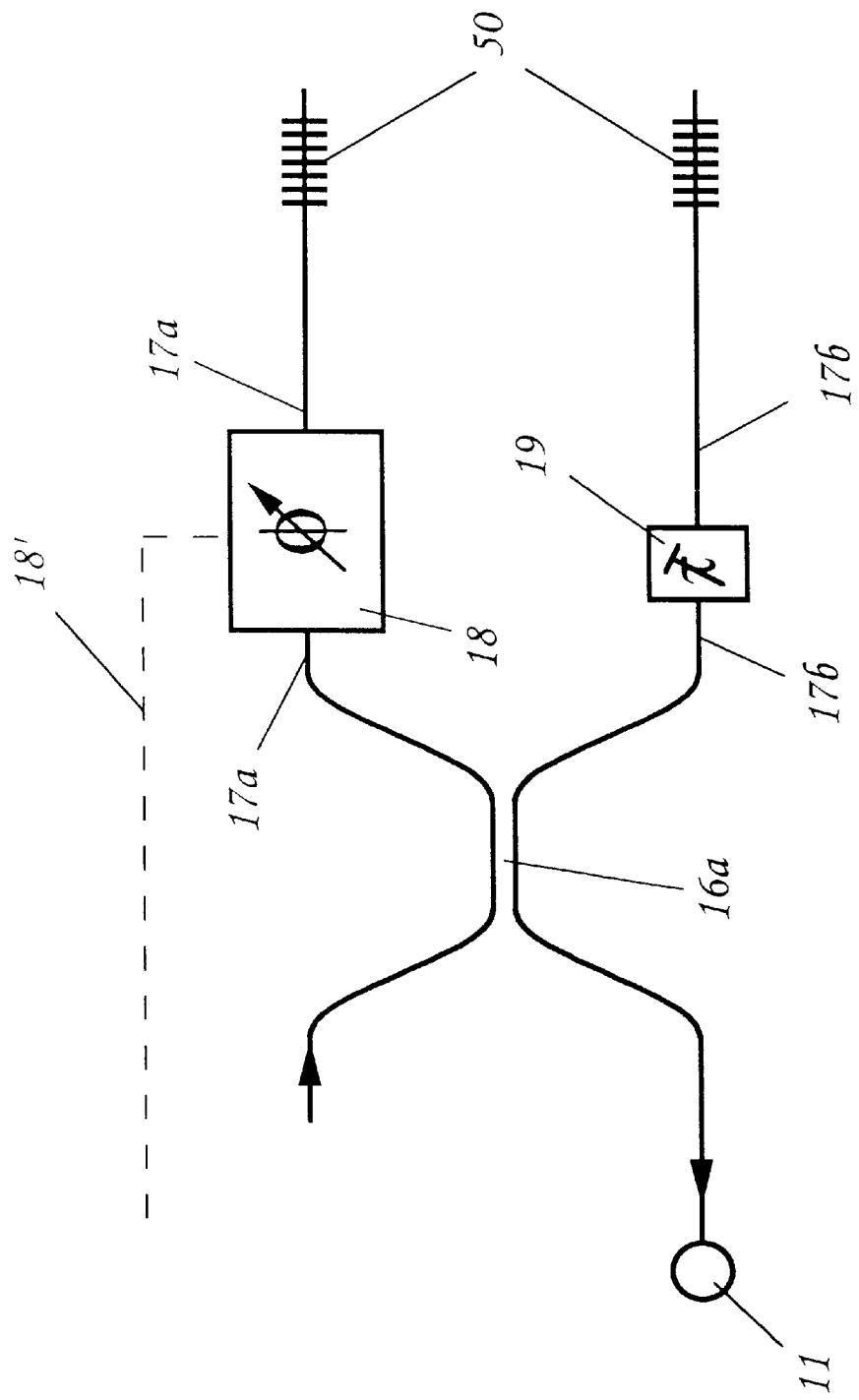
FIG. 5 is a schematic diagram of a Michelson type interferometer which may be substituted for the Mach Zehnder interferometer component of the switch, or amplitude modulator, of FIG. 1, or the transmitter of FIG. 4.

The switch of FIG. 1 and the transmitter of FIG. 4 have both been specifically illustrated as having Mach Zehnder configuration interferometers, but it should be clearly understood that the invention is not limited exclusively to the use of this particular type of interferometer configuration. By way of example, an alternative configuration which may be used in the place of the Mach Zehnder configuration is the Michelson configuration depicted in FIG. 5. This configuration of interferometer uses many of the components of the Mach Zehnder interferometers of FIGS. 1 and 4. Specifically the place of the 3 dB coupler 16b is taken by a pair of reflectors 50, which may be Bragg reflectors formed in lengths of optical waveguide, and the output 11, previously taken from one of the output ports of 3 dB coupler 16b, is now taken from the previously unused port of 3 dB coupler 16a.

Thus far in the description referring specifically to FIGS. 1 to 5 attention has been confined to the use of a signal strength modulated optical phase delay element 18 taking the form of a Kerr element. When using a Kerr element for this purpose, it is the optical signal that passes through the element itself that modulates the phase delay that it provides. In each of these specific embodiments data modulation of the optical signal is effected by the application of an electrical signal to terminal 14, and so the place of a Kerr effect format of signal strength modulated optical phase delay element 18 can readily be taken by an electro-optic modulator format one that is provided with an electrical input over an electrical connection, shown by broken line 18', that connects the element 18 with terminal 14. The electro-optic format element 18 will in this instance include suitable phase and amplitude adjustment means to that the electrical modulation provides the required π amplitude of phase shift.

In other examples of embodiment that do not already possess such an electrical signal, it can be provided by tapping off a portion of the data-modulated optical signal, and feeding that tapped-off portion to a photodetector.

We claim:

1. For light of a predetermined wavelength and intensity, an optical switch, or amplitude modulator, having an optical input optically coupled with an optical output via a tandem arrangement of an actively switchable element and an optical interferometer configuration in which light transmitted by the actively switchable element is divided substantially equally between two interference arms before being recombined, one of which arms includes a signal strength modulated optical phase delay element providing the two arms with an optical path length difference that provides destructive interference at the switch output when the light intensity through the element is substantially zero, and provides constructive interference when it is substantially half the predetermined light intensity.

2. An optical switch or modulator as claimed in claim 1, wherein the signal strength modulated optical phase delay element is constituted by a Kerr effect device.

3. An optical switch or modulator as claimed in claim 2, wherein the Kerr effect device is constituted by a semiconductor optical amplifier located in a magnetic field.

4. An optical switch or modulator as claimed in claim 1, and having a binary data modulated optical signal applied thereto, wherein the signal strength modulated optical phase delay element is constituted by an electro-optic phase modulator provided with an electrical input signal corresponding to the data content of the optical signal applied to the switch.

5. An optical switch or modulator as claimed in claim 4, wherein the electro-optic phase modulator is a lithium niobate modulator.

6. An optical switch or modulator as claimed in claim 1, wherein the optical interferometer configuration is a Mach Zehnder configuration.

7. An optical switch or modulator as claimed in claim 6, wherein the signal strength modulated optical phase delay element is constituted by a Kerr effect device.

8. An optical switch or modulator as claimed in claim 7, wherein the Kerr effect device is constituted by a semiconductor optical amplifier located in a magnetic field.

9. An optical switch or modulator as claimed in claim 6, and having a binary data modulated optical signal applied thereto, wherein the signal strength modulated optical phase delay element is constituted by an electro-optic phase modulator provided with an electrical input signal corresponding to the data content of the optical signal applied to the switch.

10. An optical switch or modulator as claimed in claim 9, wherein the electro-optic phase modulator is a lithium niobate modulator.

11. An optical transmitter having an optical source provided with a binary digital modulation input, which optical source is optically coupled with an optical output of the transmitter via an optical interferometer configuration in which light from the optical source is divided substantially equally between two interference arms before being recombined, one of which arms includes a signal strength modulated optical phase delay element providing the two arms with an optical path length difference that provides destructive interference at the output of the transmitter when the light intensity through the element is substantially zero.

12. An optical transmitter as claimed in claim 11, wherein the signal strength modulated optical phase delay element is constituted by a Kerr effect device.

13. An optical transmitter as claimed in claim 12, wherein the Kerr effect device is constituted by a semiconductor optical amplifier located in a magnetic field.

14. An optical transmitter as claimed in claim 11, wherein the signal strength modulated optical phase delay element is constituted by an electro-optic phase modulator provided with an electrical input signal corresponding to the binary digital modulation input.

15. An optical transmitter as claimed in claim 14, wherein the electro-optic phase modulator is a lithium niobate modulator.

16. An optical transmitter as claimed in claim 11, wherein the optical interferometer configuration is a Mach Zehnder configuration.

17. An optical transmitter as claimed in claim 16, wherein the signal strength modulated optical phase delay element is constituted by a Kerr effect device.

18. An optical transmitter as claimed in claim 17, wherein the Kerr effect device is constituted by a semiconductor optical amplifier located in a magnetic field.

19. An optical transmitter as claimed in claim 16, wherein the signal strength modulated optical phase delay element is constituted by an electro-optic phase modulator provided with an electrical input signal corresponding to the binary digital modulation input.

20. An optical transmitter as claimed in claim 19, wherein the electro-optic phase modulator is a lithium niobate modulator.

21. A method of enhancing the contrast ratio, provided by a binary switch or modulator, of an optical signal, in which method the binary modulated signal, modulated between a higher amplitude state and a lower amplitude state, is applied to an interferometer, in which the signal is divided into two components to propagate in respective arms of the interferometer and then the two components are interferometrically recombined, wherein the component in one of the arms is caused to propagate through an element providing an amplitude dependent optical phase delay affording constructive interferometric recombination when the binary modulated signal is in its higher amplitude state and destructive interferometric recombination when the binary modulated signal is in its lower amplitude state.

22. A method of enhancing the contrast ratio of a binary modulated signal provided by a binary amplitude modulated optical transmitter, in which method the binary modulated signal, modulated between a higher amplitude state and a lower amplitude state, is applied to an interferometer, in which the signal is divided into two components to propagate in respective arms of the interferometer and then the two components are interferometrically recombined, wherein the component in one of the arms is caused to propagate through an element providing an amplitude dependent optical phase delay affording constructive interferometric recombination when the binary modulated signal is in its higher amplitude state and destructive interferometric recombination when the binary modulated signal is in its lower amplitude state.

* * * * *